July 30, 1968     G. S. NALLE, JR     3,394,431
APPARATUS FOR EXTRUDING PLASTIC MESH, LACE OR NET FABRICS
Filed Sept. 15, 1964     2 Sheets—Sheet 1
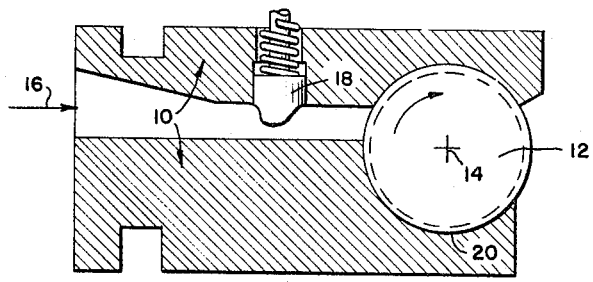
FIG. 1
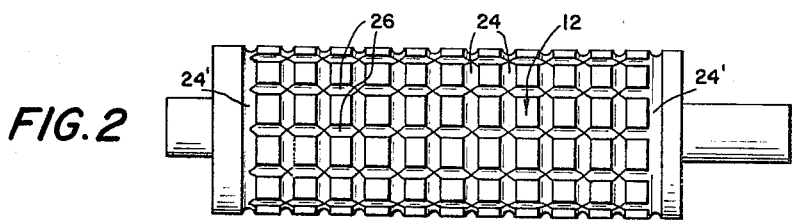
FIG. 2
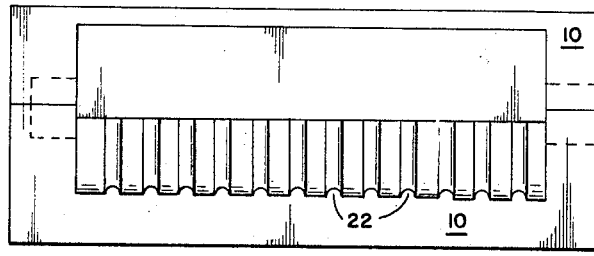
FIG. 3
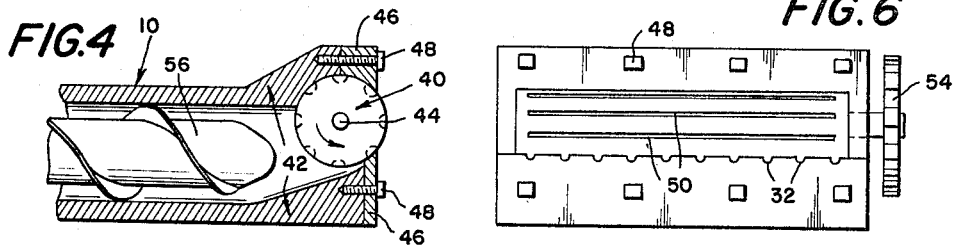
FIG. 4    FIG. 6
FIG. 5
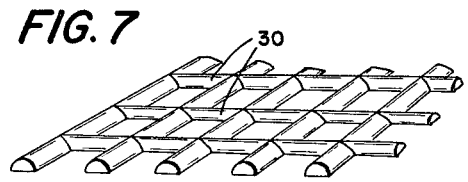
FIG. 7
INVENTOR
GEORGE S. NALLE, JR.
BY Semmes & Semmes
ATTORNEYS July 30, 1968        G. S. NALLE, JR        3,394,431
APPARATUS FOR EXTRUDING PLASTIC MESH, LACE OR NET FABRICS
Filed Sept. 15, 1964        2 Sheets-Sheet 2
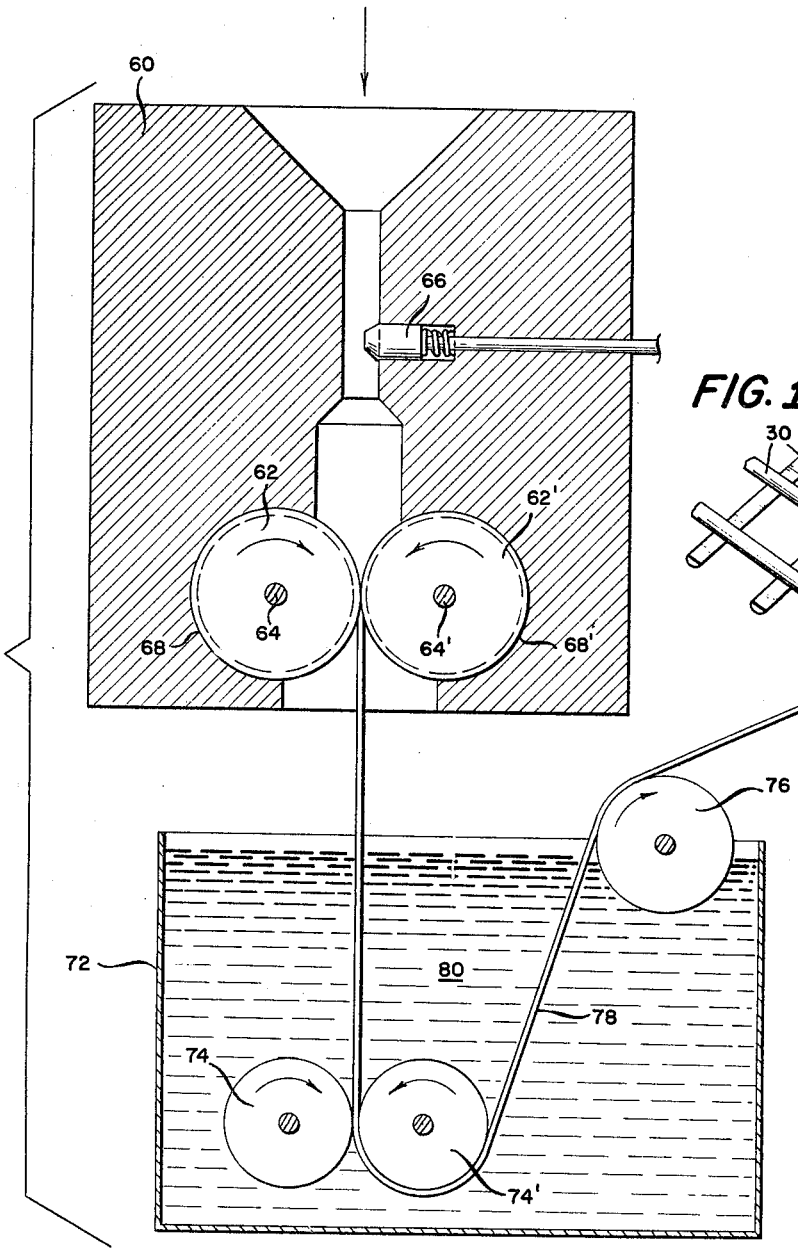
FIG. 8
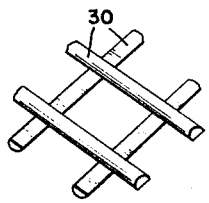
FIG. 10
FIG. 9
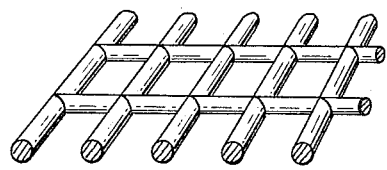
INVENTOR
GEORGE S. NALLE, JR.
BY Semmes & Semmes
ATTORNEYS

United States Patent Office 3,394,431
Patented July 30, 1968

3,394,431
APPARATUS FOR EXTRUDING PLASTIC MESH, LACE OR NET FABRICS
George S. Nalle, Jr., 108 W. 2nd St.,
Austin, Tex. 78705
Filed Sept. 15, 1964, Ser. No. 396,650
10 Claims. (Cl. 18—12)

ABSTRACT OF THE DISCLOSURE

A plastic mesh-producing apparatus extrudes plastic mesh from molten thermoplastic by continuously extruding longitudinal filaments through extrusion orifices defined between an extrusion roller and a die head or another roller and by intermittently forming cross pieces intersecting said longitudinal filaments in grooves in the roller and depositing these cross filaments across the longitudinal filaments.

---

The invention disclosed herein relates to a method and suggested apparatus for extruding mesh, lace, net or openwork fabrics from plastic materials, such as resinous plastics, plastic metals and cermets, in a single continuous operation.

The simplicity of method and mechanical construction of the present invention, with its unique characteristic of extruding mesh, lace, net or openwork fabrics, is believed to be an important improvement over the related subject matter of my U.S. Patent No. 3,067,084 entitled Die Head for Extruding Plastic Netting and Method of Extruding Such Netting, filed on Sept. 21, 1959 and application Ser. No. 778,184, now abandoned, and copending application Ser. No. 347,316.

Accordingly, it is an object of the present invention to provide apparatus for producing fabrics of superior strength resulting from the fabric fibers or filaments being fused or welded together at a multiplicity of crossings.

Another object of the present invention is to provide apparatus which effects considerable savings in production costs, because of its simplicity and inherent high production rate.

Another object of the present invention is to provide apparatus effecting substantial savings in machine investment resulting from its availability of use with commercial extrusion machines, its adaptability therewith involving only the substitution of the desired die head and associated operating elements for the conventional die head.

Still another object of the present invention is to provide an apparatus for extruding plastic mesh, lace or net fabrics with the use of a rotating, grooved roller mechanism mounted within a die head.

Other and additional objects of invention will become apparent from the ensuing specification and attached drawings which illustrate the suggested device for performing the present method, and wherein:

FIG. 1 is a vertical sectional view of a first embodiment of a suggested die head assembly including a variable choke and roller mechanism;

FIG. 2 is a side view of the roller mechanism of FIG. 1 illustrating the groove formation;

FIG. 3 is a front view of the die assembly of FIG. 1, without the roller mechanism in place, illustrating the raised sections contained within the lower die lip for plugging the grooves of the roller assembly to insure the desired flow of plastic therethrough;

FIG. 4 is a vertical sectional view of a section embodiment of a suggested die head assembly including an extrusion screw, roller mechanism, and grooved lower die lip;

FIG. 5 is a side view of the roller mechanism of FIG. 4;

FIG. 6 is a front view of the die assembly of FIG. 4 illustrating the roller mechanism and grooved lower die lip;

FIG. 7 is a perspective view of a section of mesh extruded from the first embodiment of the suggested die assemblies;

FIG. 8 is a vertical sectional view of a third embodiment of a suggested die assembly utilizing two roller mechanisms in conjunction with a cooling tank containing conveying rollers;

FIG. 9 is a perspective view of a section of mesh extruded from the third embodiment of the suggested die assemblies; and FIG. 10 is a perspective view of a section of mesh extruded according to the second embodiment, wherein two sets of half round filaments are extruded one upon the other.

As seen in FIGS. 1–3, the first embodiment of the suggested die head assembly for performing the novel extrusion method disclosed herein consists of a die tube 10 within which is mounted a roller mechanism 12 being cylindrical in configuration and mounted to turn about axis 14 which is located at a right angle to the direction of extrusion identified by reference numeral 16. A variable choke 18 is located within the top wall of die tube 10 for regulating the flow of hot plastic therethrough. Roller mechanism 12 rotates within curvilinear surface 20 containing raised sections 22, as seen in FIG. 3, for preventing the flow of plastic therethrough as sections 22 slide in engaging relationship within the circumferential grooves 24 of roller mechanism 12.

The roller mechanism 12, as seen in FIG. 2, includes a plurality of intersecting circumferential grooves 24 and lateral grooves 26 for forming the square mesh netting. Circumferential grooves 24' form selvage edges as the extruded netting produces filaments 30 being flat on one side, as seen in FIG. 7.

Referring to FIGS. 4–6, which illustrate a second embodiment of the suggested die head assembly, a modified roller mechanism 40 is mounted within die tube 42 for rotation about axis 44 which is located at a right angle to the direction of extrusion. Roller mechanism 40 is sealed within die tube 42 by plate member 46 bolted thereto by studs 48 permitting the flow of plastic into grooves 50 of roller mechanism 40 while preventing the flow of plastic around the edges of same.

Within the surface roller mechanism 40, as seen in FIG. 5, are located a series of lateral grooves 50 which function as rotating, extrusion openings or orifices. Within the edge portion of plate member 46, located immediately beneath roller mechanism 40, are located a plurality of grooves 32 functioning as fixed extrusion openings. Importantly, lateral grooves 50 terminate before reaching the extremities of roller mechanism 40.

In the second embodiment of the suggested die head assembly of FIGS. 4–6, there are ten fixed grooves 32 located within the edge portion of plate member 46 and eight rotating grooves 50 contained within roller mechanism 40. As power-driven gear 54 rotates roller mechanism 40, grooves 50 become filled with the plastic (air vents are sometimes needed) being forced towards the die head by extrusion screw 56 while grooves 32 are similarly supplied with plastic. Grooves 50 form an equal number of laterally running filaments while grooves 32 form equally spaced longitudinally running filaments which are at right angles to the lateral filaments. When a single groove 50 contacts or is tangent to a series of grooves 32, the lateral filament formed in the single groove 50 will fuse or weld to all of the longitudinal filaments formed by grooves 32 resulting in a square mesh netting having half-round filaments with the flat faces welded together, as seen in FIG. 10.

Manifestly, according to either embodiment, invention is not to be limited to extruding filaments intersecting so as to form a gridiron or square effect. For, by simple change of the grooves for lateral and longitudinal filaments, wavy, zig-zag or lace pattern mesh can be extruded.

As seen in FIG. 8, the third embodiment of the suggested die assembly for performing the novel extrusion method disclosed herein consists of die head 60 containing two adjacently positioned roller mechanisms 62 and 62' mounted for rotation about axes 64 and 64' which are located at right angles to the direction of extrusion. The flow of hot plastic through die head 10 is controlled by a variable choke 66. Along curvilinear portions 68 and 68' of die head 60 are located pluralities of raised sections (not shown), similar to sections 22 of the first embodiment illustrated in FIG. 3, which prevent the flow of hot plastic between roller mechanisms 62 and 62' and the adjacent curvilinear portions of die head 60. Immediately below die head 60 is located cooling tank 72 containing pull rolls 74 and 74' and roller 76 for conveying the finished mesh 78 through bath 80.

The adjacently positioned roller mechanisms 62 and 62' may contain both circumferential and lateral grooves (not shown) similar to those seen in FIG. 2 thus producing a mesh being circular in cross-section as seen in FIG. 9.

Manifestly, various modifications in the suggested method and devices for performing said method may be employed without departing from the spirit and scope of the invention as defined in the sub-joined claims.

What is claimed is:

1. An apparatus for extruding a plastic mesh, lace, or net fabric which comprises:
   (A) a first rotatable member having at least a first set of transverse surface grooves substantially parallel with the axis of rotation of said member;
   (B) a second member disposed proximate the outer surface of said rotatable member and defining with said rotatable member a confined space;
   (C) a plurality of extrusion orifices defined between said rotatable member and said second member directed to extrude said plastic in a plane substantially tangent to said rotatable member;
   (D) means to supply molten thermoplastic to said confined space; and
   (E) means to prevent the flow of said plastic between said rotatable member and said second member in the direction opposite the direction of rotation of said rotatable member.

2. The apparatus of claim 1 wherein said extrusion orifices are provided as circumferential grooves in said first rotatable member.

3. The apparatus of claim 1 wherein said first rotatable member has only said transverse surface grooves, and said extrusion orifices are provided as a plurality of grooves in said second member communicating with said confined space.

4. The apparatus of claim 1 wherein said second member includes a rotatable member the surface of which counterrotates in contact with said first rotatable member.

5. The apparatus of claim 4 wherein said first rotatable member and said second rotatable member have matching transverse surface grooves and matching circumferential grooves which are located in abutting relationship at the point of extrusion.

6. The apparatus of claim 1 including variable choke means provided in said second member to control the flow of molten thermoplastic to said orifices.

7. The apparatus of claim 1 including a cooling tank having means for drawing said mesh through said tank after extrusion.

8. An apparatus for extruding a plastic mesh, lace, or net fabric which comprises:
   (A) a rotatable, cylindrical extrusion means having transverse surface grooves substantially parallel to the cylindrical axis, and circumferential grooves, defining raised portions in the surface of said extrusion means between said grooves;
   (B) a die head having said extrusion means at the discharge end thereof defining a confined space together with said extrusion means, said die head including:
      (1) a first portion on one side of said confined space providing a surface in slidable contact only with the raised portions of said extrusion means; and
      (2) a second portion on the opposite side of said confined space in slidable contact with said raised portions of said extrusion means and with the surface of said circumferential grooves to prevent the flow of plastic through said circumferential grooves between said extrusion means and the second portion of said die head; and
   (C) means to supply a molten thermoplastic to said confined space.

9. An apparatus for extruding a plastic mesh, lace, or net fabric which comprises:
   (A) a rotatable, cylindrical extrusion means having transverse surface grooves substantially parallel to the cylindrical axis and defining raised portions therebetween;
   (B) a die head having said extrusion means at the discharge end thereof defining a confined space together with said extrusion means, said die head including:
      (1) a first portion on one side of said confined space having grooves communicating with said confined space for extrusion of a plurality of filaments substantially tangent to said extrusion means; and
      (2) a second portion in sliding contact with said raised portions of said extrusion means to prevent flow of plastic between said extrusion means and the second portion of said die head; and
   (C) means to supply a molten thermoplastic to said confined space.

10. An apparatus for extruding a plastic mesh, lace, or net fabric which comprises:
    (A) a die head terminating in a discharge end;
    (B) first and second cylindrical extrusion means located within said discharge and each of said first and second rotatable extrusion means including:
       (1) a first group transverse surface grooves substantially parallel to the cylindrical axis; and
       (2) a second group of spaced-apart circumferential surface grooves intersecting said first set of grooves to define raised portions on each of said extrusion means which raised portions are aligned in abutting relationship at the point of extrusion;
    (C) means for preventing flow of plastic through said circumferential grooves between each of said first and second extrusion means and said die head; and
    (D) means to supply a molten thermoplastic to the discharge end of said die head.

(References on following page)

References Cited

UNITED STATES PATENTS

| | | | |
|---|---|---|---|
| 2,489,951 | 11/1949 | Bump | 18—12 |
| 3,085,292 | 4/1963 | Kindseth. | |
| 3,090,994 | 5/1963 | Stenger | 264—329 X |
| 3,134,138 | 5/1964 | Pufahl. | |
| 3,222,440 | 12/1965 | Murphy. | |
| 3,252,181 | 5/1966 | Hureau. | |
| 3,276,942 | 10/1966 | Ewing. | |
| 3,291,879 | 12/1966 | Martin. | |

FOREIGN PATENTS

| | | |
|---|---|---|
| 641,617 | 1962 | Italy. |
| 388,983 | 1963 | Japan. |
| 1,258,370 | 1961 | France. |
| 1,085,330 | 1960 | Germany. |

JAMES A. SEIDLECK, *Primary Examiner.*

J. WOO, *Assistant Examiner.*